(12) United States Patent
Amacker (10) Patent No.: US 11,507,109 B2
(45) Date of Patent: Nov. 22, 2022

(54) SIGNALING AUTONOMOUS VEHICLES

(71) Applicant: TOYOTA RESEARCH INSTITUTE, INC., Los Altos, CA (US)

(72) Inventor: Matt Amacker, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 96 days.

(21) Appl. No.: 16/386,935

(22) Filed: Apr. 17, 2019

(65) Prior Publication Data

US 2020/0333801 A1 Oct. 22, 2020

(51) Int. Cl.
| | |
|---|---|
| G05D 1/02 | (2020.01) |
| H04W 4/40 | (2018.01) |
| G08G 1/09 | (2006.01) |
| H04W 4/80 | (2018.01) |
| G08G 1/0967 | (2006.01) |

(52) U.S. Cl.
CPC ..... *G05D 1/0276* (2013.01); *G08G 1/096725* (2013.01); *H04W 4/40* (2018.02); *H04W 4/80* (2018.02); *G05D 2201/0213* (2013.01)

(58) Field of Classification Search
CPC ........ G05D 1/0276; G05D 2201/0213; H04W 4/80; H04W 4/40; G08G 1/096725
See application file for complete search history.

(56) References Cited

U.S. PATENT DOCUMENTS

| | | | |
|---|---|---|---|
| 6,967,592 B2 | 11/2005 | Bell et al. | |
| 7,382,274 B1 | 6/2008 | Kermani et al. | |
| 9,171,459 B2 | 10/2015 | Yorke et al. | |
| 9,599,480 B2 | 3/2017 | Felemban et al. | |
| 2012/0081235 A1 | 4/2012 | Nadeem et al. | |
| 2013/0290043 A1* | 10/2013 | Hogue | G06Q 10/02 705/5 |
| 2017/0127262 A1* | 5/2017 | Hu | H04L 43/0817 |
| 2018/0023972 A1 | 1/2018 | Lei et al. | |
| 2018/0245938 A1* | 8/2018 | Song | G01C 21/3407 |
| 2018/0300964 A1* | 10/2018 | Lakshamanan | G06N 20/10 |
| 2019/0222652 A1* | 7/2019 | Graefe | H04W 84/18 |
| 2020/0105131 A1* | 4/2020 | Carter | H04W 4/40 |
| 2020/0137191 A1* | 4/2020 | Neishaboori | H04W 72/005 |
| 2020/0209852 A1* | 7/2020 | Soryal | G05D 1/0077 |

FOREIGN PATENT DOCUMENTS

EP   3 036 727 B1   3/2017

* cited by examiner

*Primary Examiner* — Rodney A Butler
(74) *Attorney, Agent, or Firm* — Oblon, McClelland, Maier & Neustadt, L.L.P.

(57) ABSTRACT

An automotive vehicle receives packets from at least one signaling device. The packets are formatted in accordance with a wireless personal area network and received exclusive of a connection being made in the wireless personal area network. Location and purpose data of the signaling device contained in the packets are analyzed and travel of the vehicle is controlled based on the location and purpose data of the signaling device.

9 Claims, 6 Drawing Sheets

SIGNALING AUTONOMOUS VEHICLES

BACKGROUND

An autonomous vehicle, as used herein, is an automobile that can navigate a roadway safely and according to established rules and regulations without human driver input. Mimicking a human driver by a machine is a challenging problem, but recent advances in, among other things, computer vision, remote sensing, vehicular navigation, data processing and machine learning have brought widespread adoption of autonomous vehicular travel closer to reality.

To make navigation and safe travel decisions, autonomous vehicles rely on data provided primarily by a host of onboard sensors and subsystems, e.g., global positioning system (GPS), radar, lidar, cameras, etc. Improving and augmenting these data and the data processing techniques operating on these data are ongoing concerns.

SUMMARY

An automotive vehicle receives packets from at least one signaling device. The packets are formatted in accordance with a wireless personal area network and received exclusive of a connection being made in the wireless personal area network. Location and purpose data of the signaling device contained in the packets are analyzed and travel of the vehicle is controlled based on the location and purpose data of the signaling device.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Figure 1:
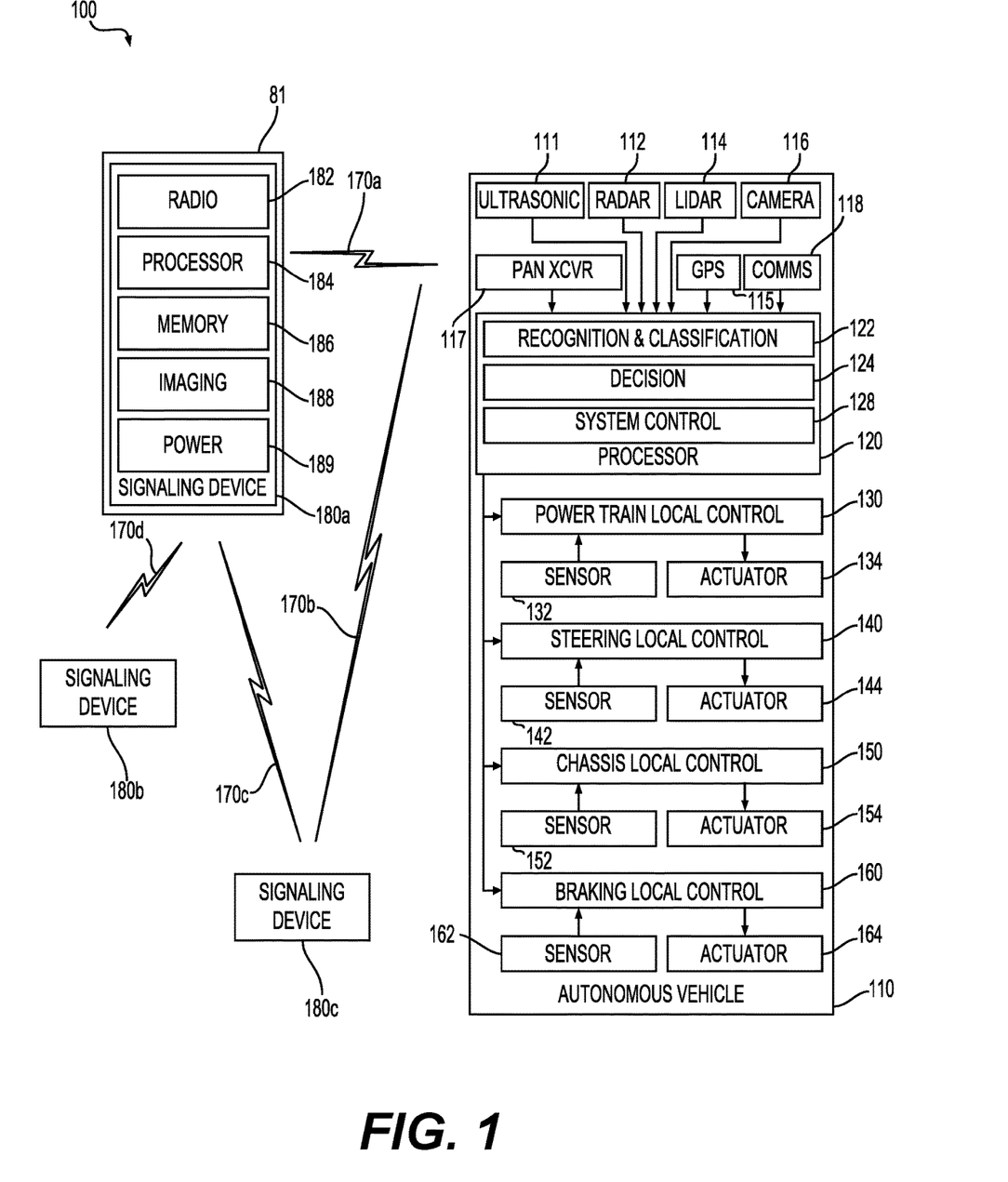
FIG. 1 is a schematic block diagram of an exemplary system by which the present invention can be embodied.

FIG. 1 is a schematic block diagram of an exemplary network configuration 100 by which the present invention can be embodied. As illustrated in the figure, network configuration 100 comprises wireless network nodes including an autonomous vehicle 110 and one or more signaling devices 180a-180c, representatively referred to herein as signaling device(s) 180. Network configuration 100 is supported by a transport medium in which communication links 170a-170d, representatively referred to herein as communication link(s) 170, are formed. In certain embodiments of the invention, the communication links 170 are wireless communication links that comply with certain air interface signaling conventions and communications protocols. In one embodiment, the air interface signaling conventions and protocols define a wireless personal area network (PAN) or similar structure that includes communicating nodes of limited transmission range. In one particular embodiment, the PAN conforms to Bluetooth Low Energy (BLE) specifications, by which certain low power features of the present invention are implemented. For example, BLE provides for low power transmission using small data packets and without making a formal connection in the network.

Exemplary autonomous vehicle 110 is constructed or otherwise configured to operate with minimal or no assistance from a human driver. To that end, autonomous vehicle 110 may include a variety of subsystems through which its external environment can be ascertained. Among possible such subsystems are ultrasonic detection and ranging subsystem 111, which uses sound waves to sense the external environment, radar subsystem 112, which uses electromagnetic radiation to sense the external environment, lidar subsystem 114, which uses light to sense the external environment, GPS subsystem 115, which determines location based on GPS satellite data, and camera subsystem 116, which captures visual and/or infrared imagery of the external environment. Such subsystems may be realized using conventional mechanisms known in the art. It is to be understood that other sensing subsystems may be used in embodiments of the invention without departing from the spirit and intended scope thereof.

Embodiments of the invention may include mechanisms by which autonomous vehicle 110 can communicate with external devices and systems. For example, autonomous vehicle 110 may include a personal area network (PAN) transceiver 117 by which communications with signaling device 180 is facilitated. PAN transceiver 117 may implement scanning mechanisms by which external devices are continually sought and may form a wireless personal area network with, for example, signaling devices 180. Such wireless personal area networks may include BLE networks, including where messages are exchanged from one network node (autonomous vehicle 110 and signaling devices 180) to another without an established a BLE connection. This may be achieved through BLE's advertising signaling conventions and protocols.

In certain embodiments, autonomous vehicle 110 may utilize communication techniques other than PAN, as represented by communications component 118. The present invention is not limited to particular communication techniques realized by other communications circuitry 118; those having skill in vehicular communications will recognize various communication techniques, e.g., satellite, cellular, WiFi, etc., that can be utilized in embodiments of the invention.

Autonomous vehicle 110 may include a processor component 120, by which, among other things, data processing and control are realized. To that end, processor component 120 may implement a recognition and classification component 122, a decision component 124 and a system control component 128. Although not explicitly illustrated in FIG. 1, processor circuitry 120 may comprise one or more processors (e.g., microprocessors, microcontrollers, digital signal processors, math coprocessors, etc.) as well as one or more memory components (random access memory, read-only memory, persistent storage memory, etc.). Upon review of this disclosure, those having skill in data processing and control will recognize numerous processor circuitry designs that can be used in embodiments of the present invention without departing from the spirit and intended scope thereof.

Exemplary recognition and classification component 122 gathers information from the sensing subsystems described above and performs various processes by which the external environment is represented by data that can be understood by a machine. Ultrasonic, radar, lidar and camera imagery may be considered separately and/or merged together to form a representation of a scene surrounding autonomous vehicle 110. Recognition and classification component 122 may analyze the representation and identify various objects and conditions in the scene. For example, the aforementioned imagery may be segmented and features in the scene may be extracted from the segmentation. The features may be provided to models realized in recognition and classification component 122, by which the features may be classified as belonging to particular objects (roads, trees, persons, other vehicles, etc.) or conditions (rain, fog, wet roads, etc.). This information may be represented by machine-readable data, as will be appreciated by those skilled in the art. The present invention is not limited to particular mechanisms by which recognition and classification is achieved, which may include machine learning techniques.

Exemplary decision component 124 analyzes the data provided by recognition and classification component 122 and determines a course of action from those data. Such actions may include continuing on a present course, accelerating or decelerating, braking, steering and other actions that might be performed by a human driver. Artificial intelligence techniques may be employed to make the decisions as to what action to perform and when, based on information on the external environment produced by recognition and classification component 122. Again, the present invention is not limited to particular mechanisms and techniques by which travel decisions are made.

Exemplary system control component 128 generates control data by which the course of action determined by decision processor 124 is put into effect. Such control data may be provided to various systems of autonomous vehicle 110, e.g., the power train, steering, chassis, brakes, etc. As illustrated in FIG. 1, each such system may have an associated local controller that is responsive to the control data: power train local control component 130 may be provided to control the vehicle's drive train (e.g., acceleration/deceleration), steering local control component 140 may be provided to control the vehicle's steering (e.g., left/right turning and cornering), chassis local control component 150 may be provided to control the vehicle's chassis component (e.g., dynamic suspension, exterior/interior lighting, etc.) and braking local control component 160 may be provided to control the vehicle's brakes (e.g., anti-locking mechanisms, braking force, etc.).

As illustrated in FIG. 1, each local controller, i.e., power train local control component 120, steering local control component 140, chassis local control component 150 and braking local control component 160, may realize control using locally obtained data, e.g., from one or more sensors 132 on the drive train, one or more sensors 142 on the steering mechanism, one or more sensors 152 on the vehicle chassis and one or more sensors 162 on the vehicle's brakes, and locally controlled actuators, e.g., one or more actuators 134 on drive train mechanisms, one or more actuators 144 on the steering mechanisms, one or more actuators 154 on the vehicle's chassis mechanisms and one or more actuators 164 on the braking mechanisms. Upon review of this disclosure, skilled artisans will recognize numerous control technologies that may realize such local control without departing from the spirit and intended scope of the present invention.

The description above of autonomous vehicle 110 is intended to provide an overview of such a vehicle and is not exhaustive. Certain functionality and features have been omitted for conciseness. As will be clear to skilled artisans from this disclosure, the present invention can be practiced using various autonomous and semi-autonomous vehicle implementations.

As illustrated at signaling device 180a, exemplary signaling device 180 (signaling devices 180b and 180c may be constructed similarly to signaling device 180a) is constructed or otherwise configured to provide data to autonomous vehicle 110, including data that may be otherwise unavailable to autonomous vehicle 110 through its own onboard resources. Such data may include the location of signaling device 180 as well as a descriptor indicating the purpose of signaling device 180 at that location, as will be explained in more detail below.

As illustrated in FIG. 1, signaling device 180 may include a housing 181, in which are disposed a radio component 182, a processor component 184, a memory component 186, an optional imaging component 188 and a power component 189. In certain embodiments, signaling device 180 is a self-contained, portable device that can be mass produced and deployed in a wide variety of scenarios. In certain embodiments, housing 181 is constructed from metal or plastic material to resemble a hockey puck.

Exemplary radio component 182 provides the mechanisms by which information is wirelessly transmitted from and received by signaling device 180. In certain embodiments, radio component 182 is constructed or otherwise configured as a BLE transceiver conforming to BLE signaling conventions and protocols. When so embodied, signaling device 180 may be configured to transmit BLE advertising packets containing location information (e.g., geographic coordinates) and information as to the purpose of signaling device 180 at its present location, which may be implemented by textual descriptions or standardized codes. BLE advertising packets provide a way for information to be conveyed without a conventional Bluetooth connection being formed.

Exemplary processor component 184 implements central control and data processing functionality of signaling device 180. Such functionality may include formatting messages into data packets and compelling radio component 182 to transmit the data packets. Other functionality described below may be realized through processor component 184. Processor component 184 may be, for example, one or more data processing devices such as microprocessors, microcontrollers, systems on a chip (SOCs), or other fixed or programmable logic, that executes instructions for process logic stored in memory. Processor component 184 may itself comprise multi-processors, and have multiple CPUs, multiple cores, multiple dies comprising multiple processors, etc.

Exemplary memory component 186 contains, among other things, the information to be contained in BLE messages as well as processor instructions for execution by processor component 184. Memory component 186 may be implemented by any quantity of any type of conventional or other memory or storage device, and may be volatile (e.g., RAM, cache, flash, etc.), or non-volatile (e.g., ROM, harddisk, optical storage, etc.), and include any suitable storage capacity.

In certain embodiments, signaling device 180 may include imaging component 188 by which its external environment can be ascertained, as described below. Visual and/or infrared (IR) cameras, among others, may be deployed as imaging component 188. The use of imagery in embodiments of the invention is described below.

Exemplary power component 189 provides electrical power to signaling device 180 and may be realized by a suitable battery and associated circuits. Power component 189 may also include other power sources, either in addition to a battery or as an alternative to a battery. For example, power component 189 may include a solar panel that can be used to recharge the battery. Alternative embodiments may be powered by an electrical power grid, should a connection be available.

Figure 2:
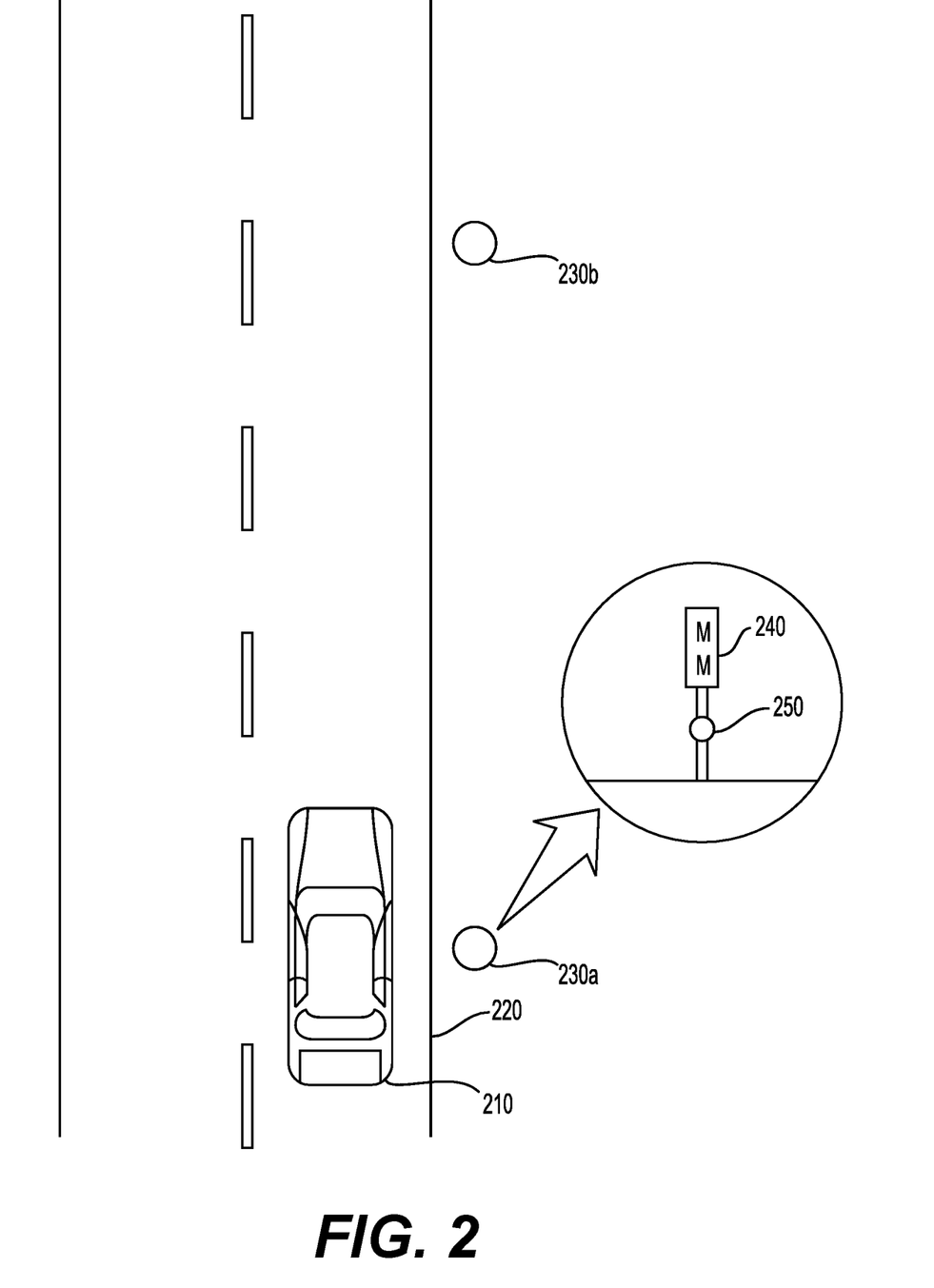
FIG. 2 is a diagram depicting one deployment scenario of an embodiment of the present invention.

FIG. 2 is a diagram depicting one deployment scenario of an embodiment of the present invention. As illustrated in the figure, an autonomous vehicle 210 is traveling along a roadway 220 along which are roadway information points 230a and 230b, representatively referred to herein as roadway information point(s) 230. As used herein, a roadway information point is a location on or about a roadway at which information is imparted to vehicles—autonomous or otherwise. Example roadway information points include various roadway signs and markings that are well known to vehicle operators. In the example of FIG. 2, roadway information points 230 are mile markers 240 at which corresponding signaling devices 250 are installed. However, it should be apparent to skilled artisans that roadway information points can include any type of object that conveys roadway and other information to drivers of vehicles, including those cases where the "driver" is a machine. Roadway information points may be cyclic or periodic, e.g., mile markers, highway exits, etc., may be situational, e.g., crosswalks, stop signs, warning signs, etc., may be temporary, e.g., construction zones, road closures, detour signs, etc., or may be any other point along a roadway at which information is conveyed to a driver or an autonomous vehicle. The present invention may be deployed at any such roadway information point to convey the same, related or unrelated information as the information that is already being conveyed thereat, should there be any. Indeed, it is to be understood that signaling devices may be deployed at information points where no other source of information is present.

Signaling devices 250 may be implemented by signaling device 180 in FIG. 1 and autonomous vehicle 210 may be implemented by autonomous vehicle 110. In one embodiment, signaling device 250 is configured with the location and identification of the corresponding mile marker 240 and may transmit such information periodically on BLE advertisement channels. A BLE-enabled receiver, such as PAN transceiver 117 in autonomous vehicle 110, receives the BLE packets and extracts the location and identification information contained therein. Autonomous vehicle 210 may update its location information based on the data contained in the transmissions from signaling devices 250 or take some other action as the situation dictates. The information contained in the BLE packets may be combined with other information acquired by autonomous vehicle 210, such as by the onboard subsystems described above, upon which autonomous vehicle 210 makes travel decisions.

Figure 3:
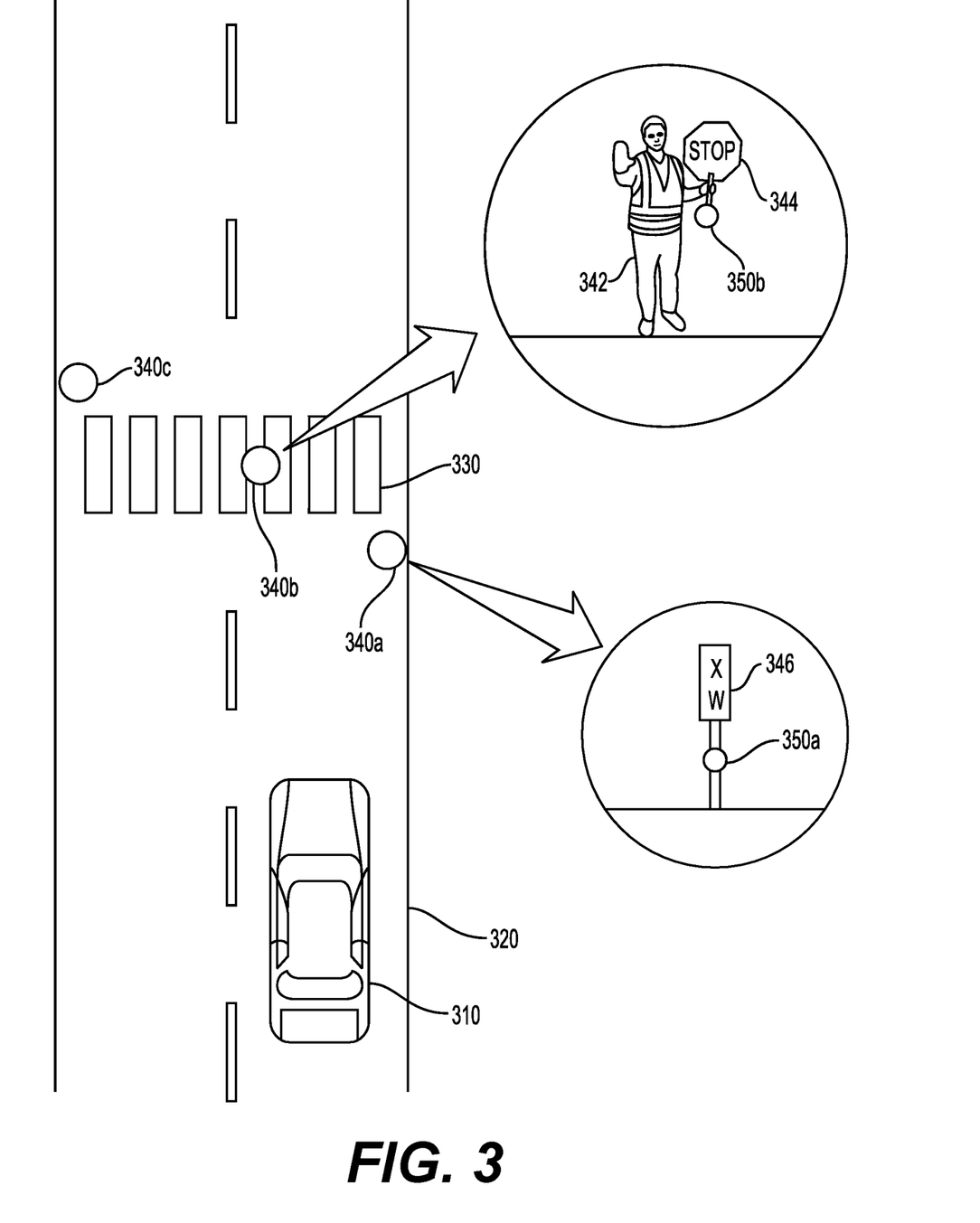
FIG. 3 is a diagram of another exemplary deployment scenario of an embodiment of the present invention.

FIG. 3 is a diagram of another exemplary deployment scenario of an embodiment of the present invention. As illustrated in the figure, an autonomous vehicle 310 is traveling on a roadway 320 across which extends a crosswalk 330. Crosswalk 330 is indicated to by information points 340a and 340c, in which are traffic signals, e.g., crosswalk sign 346, on which is disposed signaling devices, e.g., signaling device 350a. The signaling devices 350a in each information point 340a and 340c form a first spatial distribution of signaling devices. As autonomous vehicle 310 approaches the first distribution of signaling devices, it may recognize the configuration of signaling devices as a crosswalk and may adjust its mode of travel accordingly. For example, autonomous vehicle 310 may reduce its speed and proceed slowly through crosswalk 330.

At some point, crosswalk 330 may be occupied, indicated at information point 340b, by, for example, a crossing guard 342. Crossing guard 342 may carry a traffic signal, such as stop sign 344, on which is mounted a signaling device 350b. The addition of signaling device 350b to the first spatial distribution of signaling devices realizes a second distribution of signaling devices about crosswalk 330. The presence of the second distribution of signaling devices indicates to autonomous vehicle 310 that crosswalk 330 is occupied, which compels autonomous vehicle 310 to come to a stop. Autonomous vehicle 310 may remain stopped until crosswalk 330 is empty, which may be indicated to by the return of the first distribution of signaling devices, i.e., removal of signaling device 350b from the second distribution of signaling devices.

In certain embodiments, a second data set or source of the same information that is transmitted by the signaling devices described herein may be provided in a different form to redundantly provide and verify the data transmitted by the signaling device. The second source may transmit the same or similar information as the signaling device simultaneously with the transmissions by the signaling device.

Figure 4:
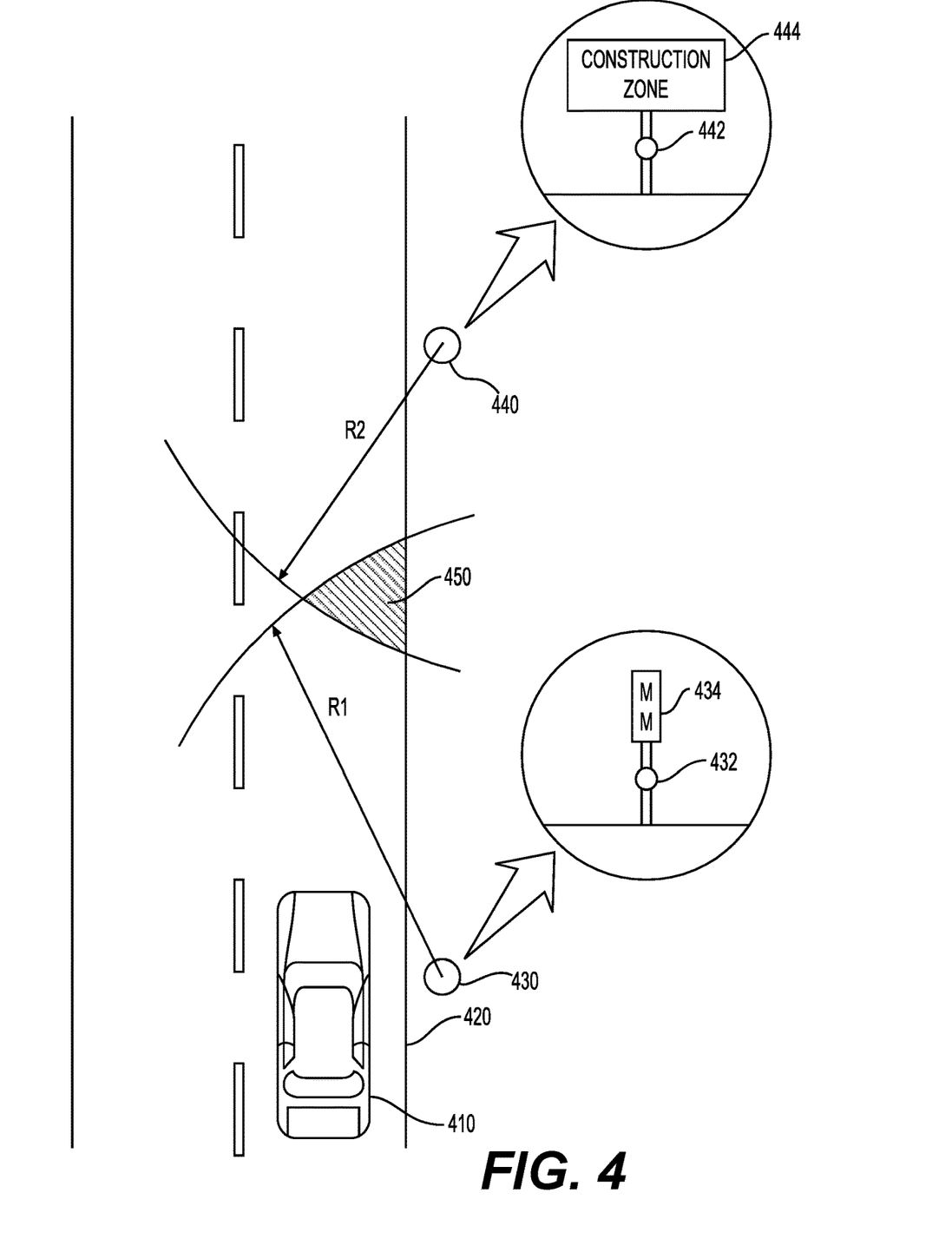
FIG. 4 is a diagram of another exemplary deployment scenario of an embodiment of the present invention.

FIG. 4 is a diagram of another exemplary deployment scenario of an embodiment of the present invention. A vehicle may be within transmission range of a mile marker signaling device 432, denoted R1 in FIG. 4, while at the same time be within transmission range of a construction zone signaling device 442, denoted R2 in FIG. 4. The region of overlapping ranges 440 is indicated in FIG. 4 by shading. The mile marker signaling device 432 may emit a signal that identifies the mile marker 434 at which the signaling device is deployed. The location identified in the BLE advertising packets may be projected redundantly in a second form. For example, the location-identified signal for mile marker 434 may be projected using a glyph (a nonverbal conveyor of information) painted in visible or IR-reflective paint. A center strip on a highway may include a glyph that is visible to a visual or IR camera onboard an autonomous or semi-autonomous vehicle, e.g., autonomous vehicle 410. The glyph may include similar and/or additional information as that transmitted by the signaling device. An autonomous or semi-autonomous vehicle may verify the identity and location of the signaling device using the visible or IR glyph.

Because an autonomous vehicle may be in range of more than one signaling device at a time and because it may be difficult to distinguish one BLE signal from multiple other BLE signals, the second data set may be used to verify the identity and information emitted by the first signaling device from among other emitters within an overlapping transmission radius.

Figure 5:
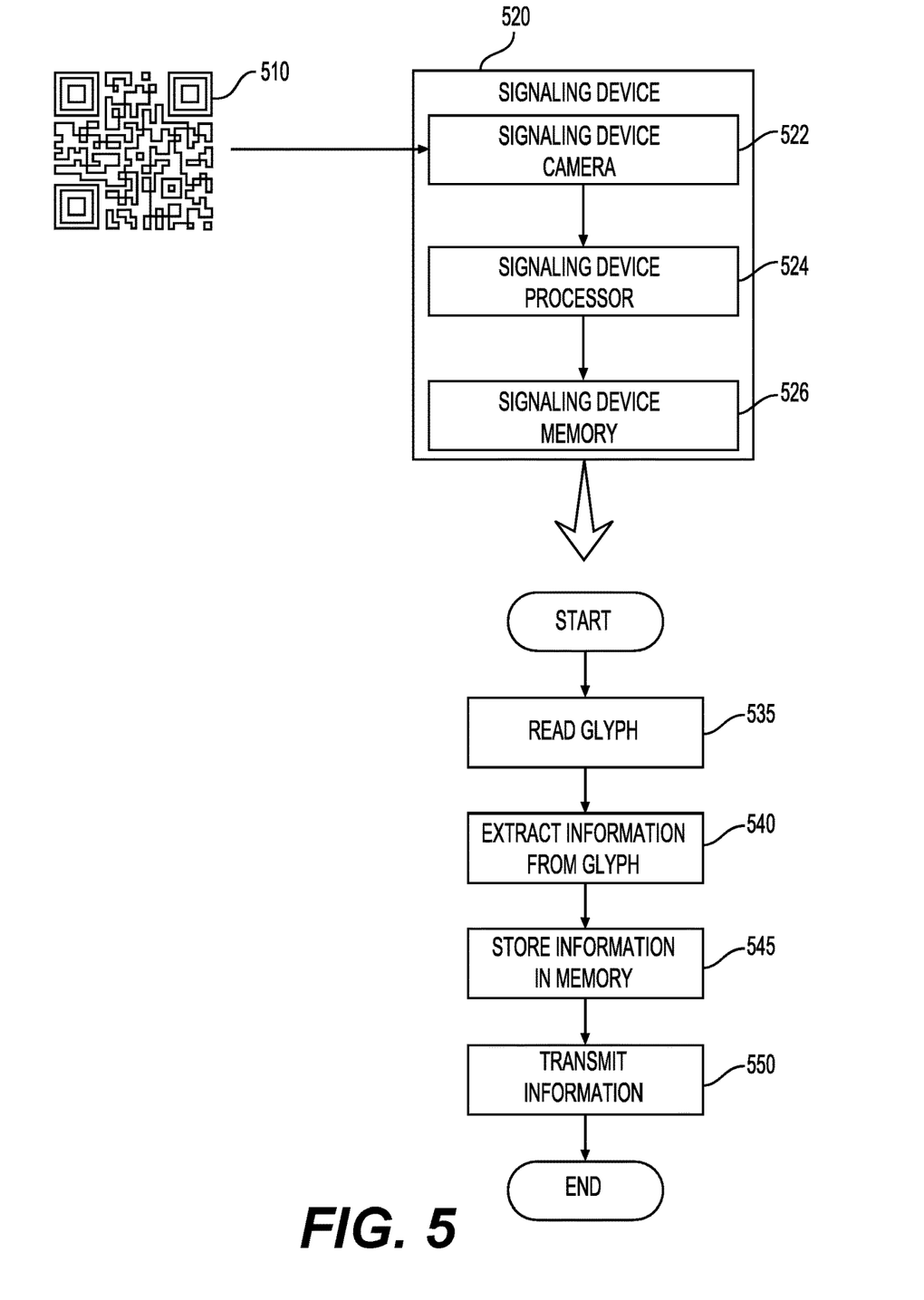
FIG. 5 is a diagram illustrating an information acquisition process in accordance with embodiments of the invention.

FIG. 5 is a diagram illustrating an information acquisition process in accordance with embodiments of the invention. As stated above with reference to FIG. 1, a signaling device 520 may include a visual or IR camera, e.g., signaling device camera 522, a processor, e.g., signaling device processor 524 and a memory, e.g., signaling device memory 526. Signaling device memory 530 may have stored therein instructions for enabling signaling device 520 to interpret and calibrate its location by capturing visual data from a visible or IR glyph, e.g., glyph 510. It is to be understood that while glyph 510 is illustrated as a quick response (QR) code, other nonverbal communication means may be used as well. The present invention is not limited to particular glyph implementations, as will be appreciated by the skilled artisan upon review of this disclosure.

Signaling device 520 may be programmed to recognize and read glyph 510, which may be disposed in a visible or IR manner. In operation 535, glyph 510 is read, such as by signaling device camera 522. In operation 540, information conveyed by glyph 510 is extracted, such as by signaling device processor 524. In operation 545, the information extracted from glyph 510 is stored, such as in signaling device memory 526. In operation 550, the information stored in memory is transmitted. In certain embodiments, the information is transmitted upon a command of a user. To do so, embodiments of the invention may include a control (not illustrated), e.g., a switch or the like, that transmits data in response to its activation.

Figure 6:
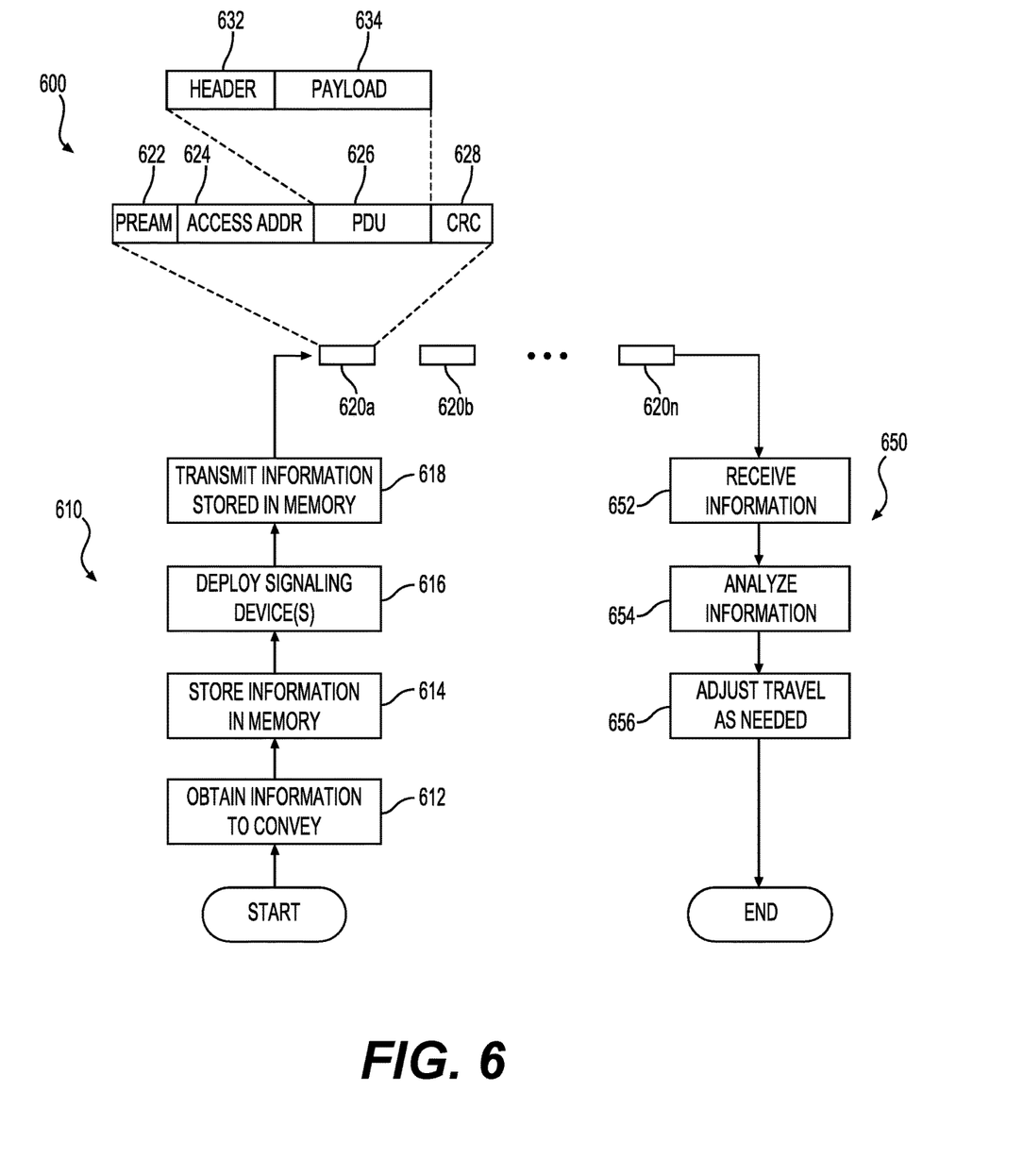
FIG. 6 is a flow diagram of a process by which the present invention can be embodied.

FIG. 6 is a flow diagram of a process 600 by which the present invention can be embodied. Process 600 comprises a signaling device side process 610 and an autonomous vehicle side process 650 that interoperate through the creation, transmission, reception and extraction of information contained in packets 620a-620n, representatively referred to herein as packets 620. In embodiments where the signaling device is in BLE advertising mode, advertising packets are broadcast periodically on dedicated advertising channels.

In one embodiment, packets 620 comprise a preamble 622, an access address 624, a protocol data unit (PDU) 626 and a cyclic redundancy check (CRC) 628. In BLE advertising packets, preamble 622 is set to a value of 10101010b and access address 624 is set to a value of 0x8E89BED6. PDU 626 may comprise a header 632 and a payload 634, which in BLE advertising packets is 6-37 bytes wide.

Signaling device side process 610 begins at operation 612, whereby the information that the device is tasked with conveying is obtained. This information can be installed at the device's manufacturing time, may be uploaded at deployment time, or may be defined by the device itself based on its environment, as explained above. In operation 614, the obtained information is stored in the signaling device's memory. In operation 616, the signaling device is deployed at the location. In operation 618, the information stored in the signaling device's memory is transmitted.

Autonomous vehicle side process 650 begins at operation 652 by receiving the information transmitted by the signaling device. In operation 654, the received information is analyzed to determine its impact on the current travel by the autonomous vehicle. For example, the information may be relevant only to the vehicle's location, in which case the travel of the autonomous vehicle may be unaffected. On the other hand, the information may indicate a condition where the vehicle must take action, such as when the crosswalk described above is occupied. Thus, in operation 656, the autonomous vehicle adjusts its travel as needed based on the analysis.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "device," "circuit," "component" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. It is to be understood that the software for the apparatuses and systems of the present invention embodiments may be implemented in any desired computer language and could be developed by one of ordinary skill in the computer arts based on the functional descriptions contained in the specification and flow charts illustrated in the drawings. Any references herein of software performing various functions generally refer to processors performing those functions under software control.

Computer program instructions may also be stored in a computer readable medium that can direct a programmable data processing apparatus or other devices to function in a particular manner, such that the instructions stored in the computer readable medium produce an article of manufacture including instructions which implement the function/act specified in the flowchart and/or block diagram block or blocks.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An apparatus comprising:
    at least one roadside signaling device including
        a housing;
        a radio component contained in the housing and configured for wireless personal area network communications including Bluetooth Low Energy (BLE) communications;
        a memory component contained in the housing and configured to store data in the form of a standardized code indicating a purpose for which the roadside signaling device is located in a region; and
        a processor contained in the housing and communicatively coupled to the radio component and the memory component, the processor configured to
            format the data in a message conforming to the wireless personal area network communications, the message including an identifier of the at least one roadside signaling device; and
            compel the radio component to transmit the message to the wireless personal area without establishing a BLE connection.

2. The apparatus of claim 1, wherein the data are indicative of roadway information by which an autonomous vehicle makes roadway travel decisions.

3. The apparatus of claim 1 further comprising:
    another roadside signaling device that, when in proximity to the at least one roadside signaling device, indicates a predetermined roadway condition.

4. The apparatus of claim 1, wherein the data are indicative of other data provided at a location of the roadside signaling device.

5. An automotive vehicle comprising:
    a radio component configured for wireless personal area network communications including Bluetooth Low Energy (BLE) communications;
    a processor communicatively coupled to the radio component and configured to:
        extract data received from a roadside signaling device without establishing a BLE connection, the data including an identifier of the roadside signaling device;
        determine a purpose of the roadside signaling device in a region from a standardized code in the extracted data; and
        cause adjustment of the travel of the vehicle based on the determined purpose of the roadside signaling device.

6. The automotive vehicle of claim 5, wherein the data are indicative of roadway information by which the vehicle can make roadway travel decisions.

7. A method of controlling an automotive vehicle comprising:
    receiving, by the automotive vehicle from at least one roadside signaling device, packets formatted in accordance with a wireless personal area network including a Bluetooth Low Energy (BLE) network, the packets being received without establishing a connection to the BLE network, the packets including an identifier of the at least one roadside signaling device;
    analyzing location and purpose data contained in the packets, the purpose data including a standardized code; and
    controlling travel of the vehicle based on the location and purpose data of the roadside signaling device.

8. The method of claim 7 further comprising:
    detecting another roadside signaling device in proximity to the roadside signaling device;
    controlling travel of the vehicle based on the other roadside signaling device being in proximity to the roadside signaling device.

9. The method of claim 7 further comprising:
    obtaining information to convey as the location and purpose data of the roadside signaling device; and
    storing the location and purpose data in a memory of the roadside signaling device; and
    transmitting, by the roadside signaling device, the location and purpose data in the packets.

* * * * *